(12) United States Patent
Li et al.

(10) Patent No.: US 11,663,059 B2
(45) Date of Patent: May 30, 2023

(54) PROJECTOR CONTROL

(71) Applicant: Microsoft Technology Licensing, LLC, Redmond, WA (US)

(72) Inventors: Li Li, Redmond, WA (US); Wei Wei, Redmond, WA (US); Xiaoli Liu, Redmond, WA (US); Yanji Cong, Redmond, WA (US); Benjamin Yan Sun, Redmond, CA (US); Hongjun Qiang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 573 days.

(21) Appl. No.: 16/617,835

(22) PCT Filed: May 24, 2018

(86) PCT No.: PCT/US2018/034266
§ 371 (c)(1),
(2) Date: Nov. 27, 2019

(87) PCT Pub. No.: WO2018/231483
PCT Pub. Date: Dec. 20, 2018

(65) Prior Publication Data
US 2020/0174859 A1  Jun. 4, 2020

(30) Foreign Application Priority Data
Jun. 16, 2017 (CN) .......................... 201710456069.9

(51) Int. Cl.
*G06F 9/54* (2006.01)
*G06F 9/451* (2018.01)
(Continued)

(52) U.S. Cl.
CPC ............. *G06F 9/545* (2013.01); *G03B 21/14* (2013.01); *G06F 9/30189* (2013.01);
(Continued)

(58) Field of Classification Search
CPC ....... G03B 21/14; G06F 9/545; G06F 9/4511; G06F 9/30189
(Continued)

(56) References Cited

U.S. PATENT DOCUMENTS 6,735,616 B1   5/2004  Thompson et al.
8,261,231 B1   9/2012  Hirsch et al.
(Continued)

FOREIGN PATENT DOCUMENTS

CN   103576846 A   2/2014
CN   105027531 A   11/2015
(Continued)

OTHER PUBLICATIONS

Machine Translation of 205847375 (Year: 2022).*
(Continued)

*Primary Examiner* — Jerry L Brooks
(74) *Attorney, Agent, or Firm* — ArentFox Schiff LLP

(57) ABSTRACT

In the subject matter described herein, a method, device and computer program product for controlling the projector are proposed. According to the method, the application for controlling the project can be started. The application can determine the operation mode by determining whether the current host device is the projector or a terminal device for controlling the projector. Once the operation mode of the application is determined, the method can control the projector based on the operation mode and via the application service operating on the projector. The application service can provide an interface for controlling a device driver of the projector.

19 Claims, 12 Drawing Sheets

(51) Int. Cl.
*G03B 21/14* (2006.01)
*G06F 9/30* (2018.01)
*G06F 9/445* (2018.01)
*G10L 15/22* (2006.01)

(52) U.S. Cl.
CPC .......... *G06F 9/44505* (2013.01); *G06F 9/451* (2018.02); *G10L 15/22* (2013.01); *G10L 2015/223* (2013.01)

(58) Field of Classification Search
USPC .......................................................... 353/85
See application file for complete search history.

(56) References Cited

U.S. PATENT DOCUMENTS

| | | | |
|---|---|---|---|
| 8,320,621 | B2 | 11/2012 | McEldowney |
| 8,323,041 | B2 | 12/2012 | Gore et al. |
| 2003/0117532 | A1 | 6/2003 | Karasawa et al. |
| 2005/0213044 | A1 | 9/2005 | De Vaan |
| 2007/0016653 | A1 | 1/2007 | Larsen et al. |
| 2007/0162583 | A1 | 7/2007 | Takahashi et al. |
| 2010/0195064 | A1 | 8/2010 | Kim et al. |
| 2012/0086915 | A1* | 4/2012 | Rosen ............... H04N 9/3147 353/30 |
| 2012/0098851 | A1 | 4/2012 | Yamaguchi et al. |
| 2013/0021223 | A1 | 1/2013 | Ichieda |
| 2014/0320908 | A1* | 10/2014 | Iwauchi ............. H04L 45/24 358/1.15 |
| 2015/0036058 | A1 | 2/2015 | Ng et al. |
| 2017/0168377 | A1 | 6/2017 | Fujii et al. |

FOREIGN PATENT DOCUMENTS

| | | | |
|---|---|---|---|
| CN | 205721035 | U | 11/2016 |
| CN | 205847375 | U * | 12/2016 |
| CN | 205847375 | U | 12/2016 |
| KR | 20120041451 | A | 5/2012 |
| WO | 2007128317 | A1 | 11/2007 |

OTHER PUBLICATIONS

"Second Office Action and Search Report Issued in Chinese Patent Application No. 201710456069.9", dated Nov. 23, 2021, 14 Pages.
"First Office Action and Search Report Issued in Chinese Patent Application No. 201710456069.9", dated Feb. 1, 2021, 14 Pages.
"Wireless Projector Control app for Android", Retrieved from: https://www.christiedigital.com/en-us/business/solutions/wireless-projector-control/Christie-Virtual-Remote, Retrieved Date: May 15, 2017, 2 Pages.
Chang, et al., "Adaptive Role Switching Protocol for Improving Scatternet Performance In Bluetooth Radio Networks", In Journal of IEEE Transactions on Consumer Electronics, vol. 52, Issue 4, Nov. 2006, pp. 1229-1238.
"International Search Report and Written Opinion Issued in PCT Application No. PCT/US2018/034266", dated Aug. 16, 2018, 14 Pages.
"Office Action Issued in Chinese Patent Application No. 201710456069.9", dated Mar. 17, 2022, 5 Pages.
"Office Action Issued in Indian Patent Application No. 202047001916", dated Mar. 9, 2022, 7 Pages.
"Notice of Allowance Issued in Chinese Patent Application No. 201710456069.9", dated May 27, 2022, 4 Pages.

* cited by examiner

PROJECTOR CONTROL

CROSS REFERENCE TO RELATED APPLICATIONS

This application is a 35 U.S.C. § 371 National Phase of PCT Application No. PCT/US2018/034266, filed on May 24, 2018, which claims priority to Chinese Application No. 201710456069.9, filed on Jun. 16, 2017, the contents of which are incorporated by reference in their entireties.

BACKGROUND

As "the fourth screen" after televisions, personal computers (PCs) and cellphones, projectors with powerful display capabilities are considered to have great development prospects in working and entertainment scenarios. A conventional projector is generally not equipped with an intelligent operating system, hence having very limited functions. For instance, the traditional projectors can only project video signals from a computer, a video player and/or a game console onto a screen via different interfaces.

At present, a smart projector equipped with an intelligent operating system and having an independent user interface has been developed. These smart projectors are generally developed based on an open operating system, which may result in weak compatibility with office applications commonly used in PCs and may cause security risks. Besides, in the implementations of these smart projectors, applications for controlling the projectors usually access underlying hardware modules of the projectors (such as hardware drivers) directly. As a result, the projector manufacturer usually needs to develop different applications for controlling projectors for different application scenarios and/or different hardware platforms.

SUMMARY

The inventor has realized that the control of a smart projector based on a universal operating system platform usually faces the following problems and challenges: how to enable a projector manufacturer to develop an application for controlling a projector in a manner that is transparent to the hardware platform such that the same application can operate on different hardware platforms; and how to enable the application to determine its operation mode automatically such that the application can adapt to different application scenarios automatically (such as local control and remote control).

Hereby, implementations of the subject matter described herein provide a method, a device and a computer program product for controlling a projector. According to the method, the application for controlling the projector can be started. The application determines an operation mode by determining whether a current host device is a projector or a terminal device for controlling the projector. Once the operation mode of the application is determined, the method can control the projector based on the operation mode and via an application server operating on the projector. The application server can provide an interface for controlling a device driver of the projector.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols refer to the same or similar elements.

DETAILED DESCRIPTION

Figure 1:
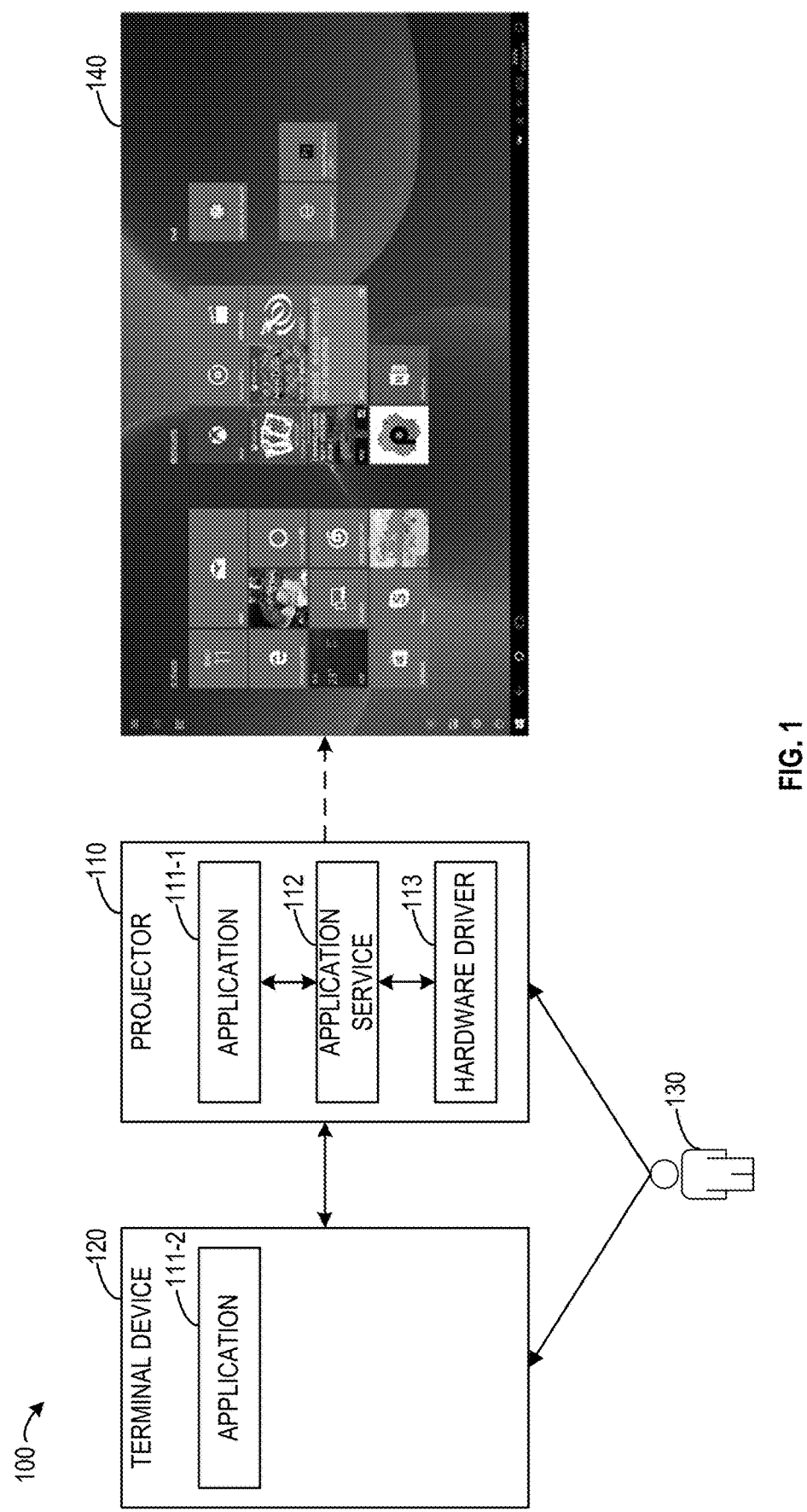
FIG. 1 illustrates a block diagram of a system 100 where implementations of the subject matter described herein can be implemented.

The subject matter described herein will now be discussed with reference to several example implementations. It should be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below. A definition of a term is consistent throughout the description unless the context clearly indicates otherwise.

As described above, a smart projector equipped with an intelligent operating system and having an independent user interface has been developed. These smart projectors are generally developed based on an open intelligent operating system, which may result in poor compatibility with office applications commonly used in PCs and may cause security risks. Besides, in the implementations of these smart projectors, applications for controlling the projectors usually access underlying hardware modules of the projectors directly. As a result, the projector manufacturer generally needs to develop different applications for controlling projectors for different application scenarios and/or different hardware platforms.

According to an example implementation of the subject matter described herein, there is proposed a scheme for controlling a smart projector based on a universal operating system platform. With the scheme, the projector manufacturer can develop an application for controlling the projector in a manner that is transparent to the hardware platform such that the same application can operate on different hardware platforms. Moreover, the scheme enables the application to determine its operation mode by itself to adapt to different application scenarios, such as local control and remote control, automatically. Therefore, with the scheme, the projector manufacturer can implement a smart projector based on, for instance, Universal Windows Platform (UWP) efficiently, which achieves better compatibility with office applications commonly used in PCs and more security, thereby providing users with better operating experience. It should be noted that for the sake of convenience, several example implementations of the subject matter described herein might be described with reference to UWP. However, it is to be understood that this is only an example, without suggesting any limitations to the scope of the subject matter described herein in any manner.

FIG. 1 illustrates a block diagram of a projector control system 100 where implementations of the subject matter described herein can be implemented. As shown in FIG. 1, the system 100 may comprise a projector 110 and a terminal device 120. It is to be understood that the structure and functionality of the system 100 are described only for the purpose of illustration without suggesting any limitations to the scope of the subject matter described herein. The subject matter described herein can be embodied with a different structure and/or functionality.

The "terminal device" described herein may be a user equipment (UE) or any terminal that has wired or wireless communication function, including but not limited to, a cellphone, a computer, a personal digital assistant, a game console, a wearable device, a vehicle-mounted communication device, a sensor and so on.

In some implementations, the projector 110 can be communicatively coupled with the terminal device 120 via, for instance, Bluetooth or any other wired or wireless communication protocols. The terminal device 120 can provide remote control for the projector 110. For example, in some implementations, a user 130 can control the projector 110 directly to output projection display 140 (also called "local control" scenario). In some other implementations, the user 130 can also control projector 110 indirectly by controlling the terminal device 120 to output the projection display 140 (also called "remote control" scenario).

As shown in FIG. 1, in some implementations, the projector 110 may comprise an application 111-1, an application service 112, a hardware driver 113 and other modules. In some implementations, such as in the local control scenario, the user 130 can control the projector 110 directly by operating the application 111-1 to output the projection display 140. In some implementations, the application 111-1, for instance, may comprise an application service extension module (not shown in FIG. 1) for interacting with the application service 112. For example, the application service extension module can provide a uniform interface for operating the projector to the application 111-1 while the application service 112 can provide an interface for accessing the hardware driver 113 to the application service extension module. In other words, the application 111-1 can access the hardware driver 113 via the application service 112. In this manner, the application 111-1 and the hardware driver 113 can be loosely coupled. That is, the same application can operate on different hardware platforms.

In some implementations, the projector 110 can be equipped with an intelligent operating system (not shown in FIG. 1), such as UWP. For example, with UWP, the application 111-1 can adjust the size, resolution and other parameters of its user interface easily and dynamically. Besides, the operating system can provide application supports, such as office application (for example, Microsoft Office suite) and voice assistant (such as Cortana). For example, with UWP, the user 130 can operate the application 111-1 with a voice command to control the projector 110 to output the projection display 140.

In some implementations, the application 111-1 and the application service 112 can operate in a user mode (also called "user state") of the operating system while the hardware driver 113 can operate in a kernel mode (also called "kernel state") of the operating system. For example, the application service 112 can be a process operating in the user state and provide an interface to the hardware driver 113 operating in the kernel state. Moreover, in some implementations, the application service 112 can also provide interfaces to office application, voice assistant and so on provided by the operating system. For example, the application service 112 can access the hardware driver 113 in the kernel state on behalf of the operating system. The system architecture of the projector 110 will be described in further details in the following with reference to FIG. 3.

As shown in FIG. 1, the terminal device 120 may include an application 111-2. In some implementations, for example, in the remote control scenario, the user 130 may control the projector 110 indirectly by operating the application 111-2. The application 111-2 and the application 111-1 are instances of a same application and collectively called as "application 111" in the following depiction. For example, the terminal device 120 can also be equipped with the same intelligent operating system (such as UWP) as the projector 110. In this case, different from the traditional scheme in which different applications have to be developed for different hardware platforms and/or devices, the same application can be deployed on the projector 110 and the terminal device 120 respectively, for instance, to adaptively implement local control and/or remote control of the projector 110 automatically. In some implementations, as will be described below in further details, the application 111-2 and the application 111-1 likewise access the hardware driver 113 via the application service 112. For example, the application 111-2 may also comprise an application service extension module (not shown in FIG. 1) for interacting with the application service 112. In some implementations, the application service extension module in the application 111-2 can provide to application 111-2 a uniform interface for operating the projector and interact with application service 112 via a wired and/or wireless communication protocol, for instance.

In some implementations, the application 111 (for example, application 111-2 and/or application 111-1) can determine its operation mode automatically by determining whether the current host device is the projector 110 or the terminal device 120, and perform local control and/or remote control of the projector 110 based on the determined operation mode. For example, the application 111 can determine whether the current host device is the projector 110 or the terminal device 120 by determining whether the application service 112 exists or not. In some implementations, the application 111-1 can determine that the current host device is the projector 110 by detecting that the application service 112 and the application 111-1 operate on the same device. The application 111-2 can determine that the current host device is the terminal device 120 by detecting that the application service 112 and the application 111-2 operate on different devices.

In some implementations, the application 111-1 can determine that its operation mode is a first operation mode for the projector by determining that the host device is the projector 110, while the application 111-2 can determine that the operation mode is a second operation mode for the terminal device by determining that the host device is the terminal device 120. The applications 111-1 and 111-2 can adaptively implement local control and/or remote control of the projector 110 via the application service 112. Besides, during performing local control and/or remote control of the projector 110, the states (for example, respective state data, user interface display associated with a respective application and so on) of the applications 111-1 and 111-2 can be synchronized automatically.

Figure 2A:
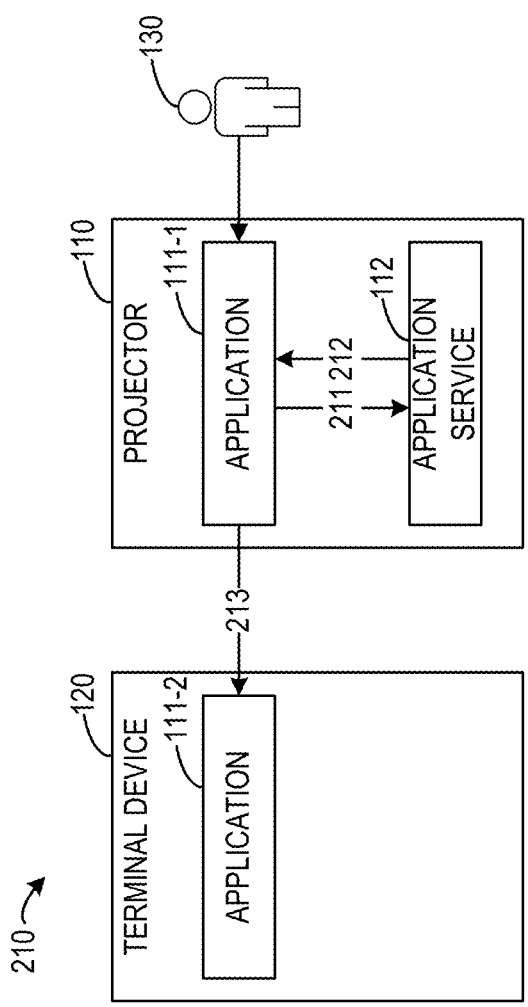
FIGS. 2A-2B illustrate schematic diagrams of example processes of controlling the projector via applications in different operation modes in accordance with the implementations of the subject matter described herein.

FIG. 2A illustrates a process 210 for performing local control of the projector 110 via the application 111-1 in the first operation mode according to the implementations of the subject matter described herein. As shown in FIG. 2A, in response to an operation of the user 130 on the application 111-1, the application 111-1 may send (211) a first command for controlling the projector 110 to the application service 112. The application service 112 can cause the projector 110 to output the projection display 140 corresponding to the operation of the user 130 by accessing the hardware driver 113 based on the first command. The application 111-1 may receive (212) from the application service 112 a response to the first command. Then, the application 111-1 may send (213) to the application 111-2 a second command for synchronizing states between the applications 111-1 and 111-2. For example, the application 111-2 may update its own state based on the second command (for example, state data and user interface display associated with the application 111-2, and so on). In this manner, different instances of the same application deployed on different devices for controlling the projector can keep states synchronized.

Figure 2B:
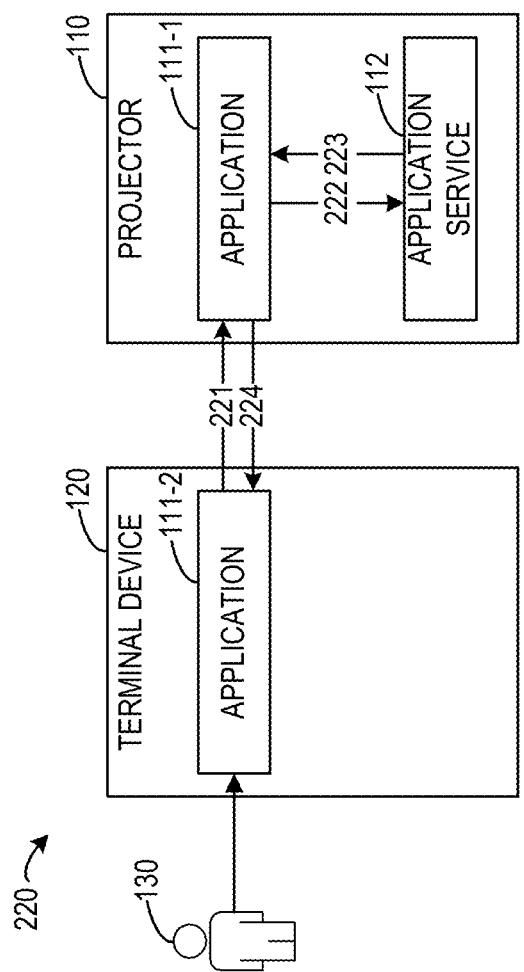

FIG. 2B illustrates a process 220 for performing remote control of the projector 110 via the application 111-2 in the second operation mode according to the implementations of the subject matter described herein. As shown in FIG. 2B, in response to an operation of the user 130 on the application 111-2, the application 111-2 may send (221) a third command for controlling the projector 110 to the application 111-1. Correspondingly, the application 111-1 may send (222) a fourth command for controlling the projector 110 to the application service 112 based on the third command. The application service 112 can cause the projector 110 to output the projection display 140 corresponding to the operation of the user 130 by accessing the hardware driver 113 based on the fourth command. The application 111-1 may receive (223) from the application service 112 a response to the fourth command. After that, the application 111-1 may send (224) to the application 111-2 a fifth command for synchronizing states between the applications 111-1 and 111-2. For example, the application 111-2 may update its own state based on the fifth command (such as state data associated and user interface display associated with the application 111-2, and soon). In this manner, different instances of the same application deployed on different devices for controlling the projector can keep states synchronized.

Figure 3:
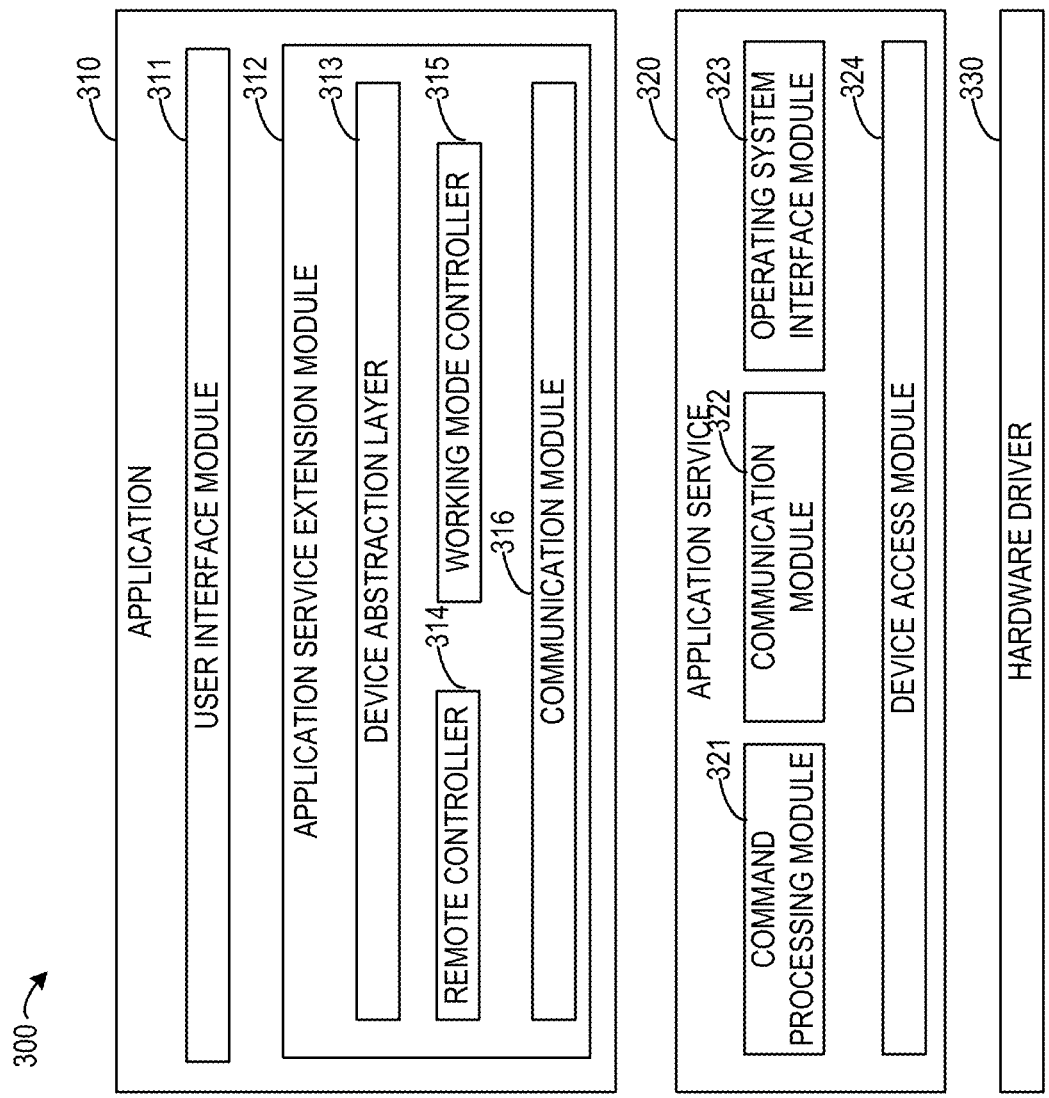
FIG. 3 illustrates a schematic diagram of an example architecture 300 of a projector in accordance with the implementations of the subject matter described herein.

FIG. 3 illustrates a schematic diagram of an example architecture 300 of the projector 110 according to the implementations of the subject matter described herein. In some implementations, the architecture 300 can be considered as an example implementation of the projector 110. As shown in FIG. 3, the architecture 300 includes an application 310 which can be implemented as the application 111-1 shown in FIG. 1. It is to be understood that the applications 111-2 and 111-1 as shown in FIG. 1 are instances of the same application on different devices. In other words, in some implementations, the application 310 as shown in FIG. 3 can also be considered as an example implementation of the application 111-2. Moreover, the architecture 300 further includes an application service 320 and a hardware driver 330 which can be implemented as the application service 112 and the hardware driver 113 as shown in FIG. 1, respectively. It is to be understood that the structure and functionality of the architecture 300 are depicted only for the purpose of example, without suggesting any limitations to the scope of subject matter described herein. The subject matter described herein can be embodied in different structures and/or functionalities. Furthermore, some or all of these modules included in the architecture 300 can be implemented by software, hardware, firmware and/or any combination thereof.

In some implementations, the application 310 may comprise a user interface module 311 and an application service extension module 312. The user interface module 311 may be, for example, a user interface for displaying the application 310 so that the user can operate via the displayed user interface. The application service extension module 312, for instance, may provide to the user interface module 311 a uniform interface for operating the projector. As shown in FIG. 3, for instance, the application service extension module 312 may comprise sub-modules, such as a device abstraction layer 313, a remote controller 314, a working mode controller 315, a communication module 316 and so on. The device abstraction layer 313 can be used to provide a projector control interface to the user interface module 311, for example, including but not limited to, interfaces for powering on, powering off, luminance control, content adaptive illumination control, and volume control. The remote controller 314, for instance, can be used to achieve connection to, communication with and control of a remote application instance (such as the application 111-2 as shown in FIG. 1), and the like. The working mode controller 315, for instance, can determine the operation mode of the application 310 automatically by determining whether the current host device is a projector or a remote terminal device. The communication module 316, for instance, can achieve communication with the application service 320, and so on.

In some implementations, the application service 320, for example, may comprise a command processing module 321, a communication module 322, an operating system interface module 323, a device access module 324, and so on. The command processing module 321, for example, can be used to process commands from the application 310 and access the hardware driver 330 via the device access module 324 based on the command. The communication module 322 can, for instance, achieve communication with the application 310, and so on. The operating system interface module 323, for instance, can provide interfaces to an office application and a voice assistant provided by the operating system. The device access module 324, for example, can implement access to the device driver 330.

Figure 4:
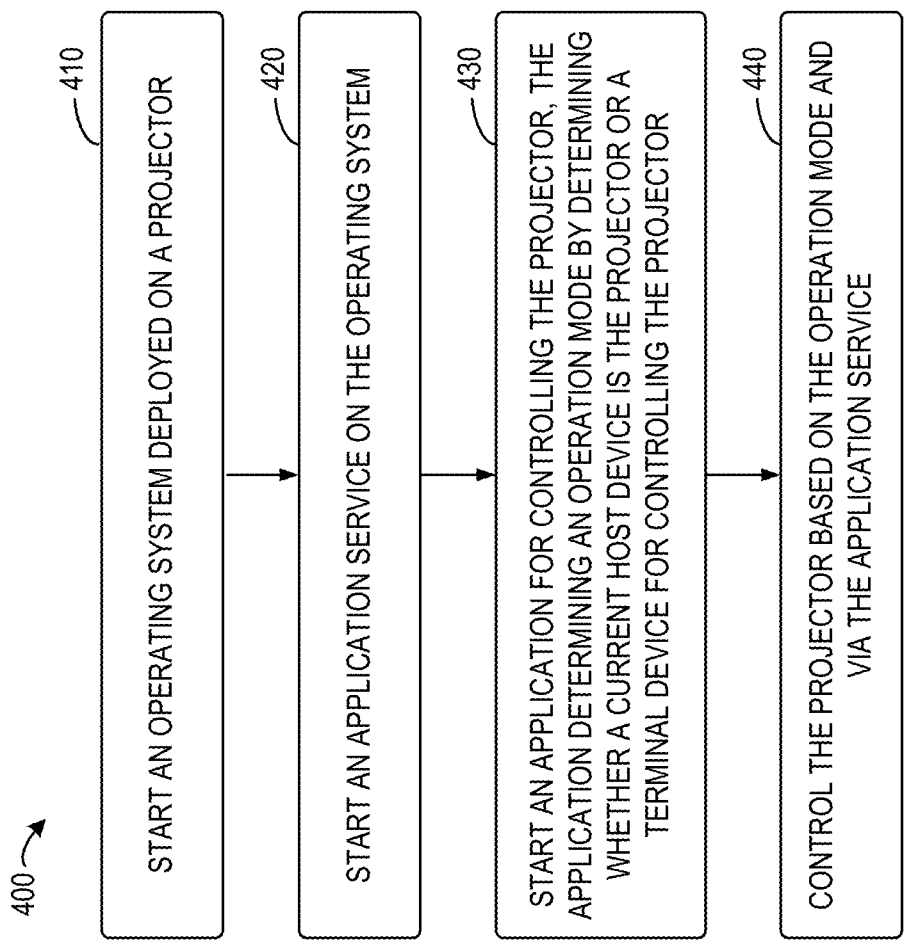
FIG. 4 illustrates a flowchart of an example method 400 for controlling the projector in accordance with the implementations of the subject matter described herein.

FIG. 4 illustrates a flowchart of an example method 400 for controlling the projector according to the implementations of the subject matter described herein. In some implementations, the method 400 can be, for instance, executed at the projector 110 shown in FIG. 1. For the ease of depiction, the method 400 will be described in the following with reference to the system 100 as shown in FIG. 1. It is to be understood that the method 400 may further comprise additional steps not shown and/or omit the shown steps. The scope of the subject matter described herein is not limited in this aspect.

At block 410, an operating system deployed on the projector 110 is started. For example, the operating system may be an intelligent operating system such as UWP. In some implementations, the operating system can be uploaded and started automatically in response to the powering on of the projector 1110. In some other implementations, after the operating system is started, for instance, the hardware driver 113 can be uploaded and operate in the kernel state of the operating system.

At block 420, the application service 112 can be started on the operating system. In some implementations, the application service 112, for instance, can operate in the user state of the operating system and provide an interface for controlling the hardware driver of the projector 110. In some other implementations, the application service 112, for example, can further provide interfaces, for instance, to office applications and voice assistant provided by the operating system.

Figure 5:
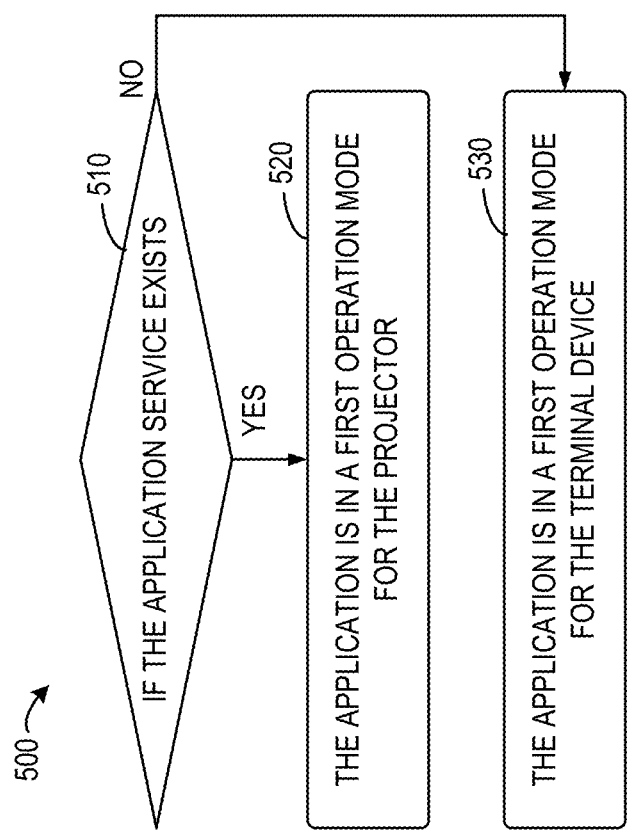
FIG. 5 illustrates a flowchart of a method 500 for determining an operation mode in accordance with the implementations of the subject matter described herein.

At block 430, the application 111-1 for controlling the projector 110 is started. In some implementations, the application 111-1 can determine its operation mode by determining whether the current host device is the projector 110 or the terminal device 120 for controlling the projector 110. For example, FIG. 5 shows a flowchart of a method 500 for determining the operation mode according to the implementations of the subject matter described herein. The method 500 can be implemented by the application 111-1.

As shown in FIG. 5, at block 510, the application 111-1 can determine if the application service 112 and the application 111-1 operate on the same device (namely, if the application service 112 exists). If the application service 112 exists, then at block 520, the operation mode of application 111-1 can be determined to be a first operation mode for the projector. Otherwise, at block 530, the operation mode of the application 111-1 can be determined to be a second operation mode for the terminal device. As the application service 112 and the application 111-1 operate on the same device, the operation mode of application 111-1 can be determined to be the first operation mode for the projector.

Returning to FIG. 4, the method 400 proceeds to block 440, where the projector 110 is controlled based on the operation mode of the application 111-1 and via the application service 112.

Figure 6:
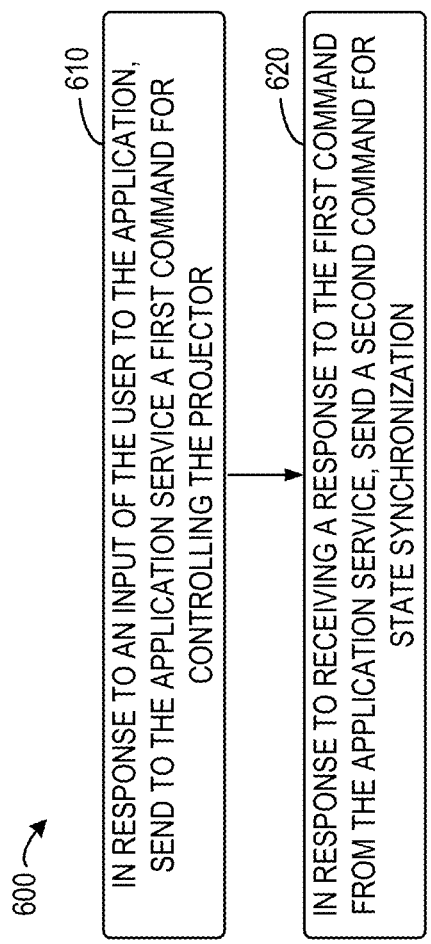
FIG. 6 illustrates a flowchart of a method 600 for controlling the projector based on the operation mode in accordance with the implementations of the subject matter described herein.

FIG. 6 illustrates a flowchart of a method 600 for controlling the projector based on the operation mode according to some implementations of the subject matter described herein. The method 600 is targeted to the local control scenario. That is, the user controls the projector 110 by operating the application 111-1. In some implementations, the method 600 can be considered as an example implementation of block 440 as shown in FIG. 4.

As shown in FIG. 6, at block 610, in response to an input of the user to the application 111-1, the application 111-1 sends a first command for controlling the projector 110 to the application service 112. For example, the application service 112 can cause the projector 110 to output the projection display 140 corresponding to the input of the user by accessing the hardware driver 113 based on the first command. Furthermore, the application service 112 can return to the application 111-1 a response to the first command.

At block 620, in response to receiving from the application service 112 a response to the first command, the application 111-1 may send to the application 111-2 a second command for synchronizing states between the applications 111-1 and 111-2. For example, the application 111-2 may update its own state (for example, state data and user interface display associated with the application 111-2 and so on) based on the second command.

Figure 7:
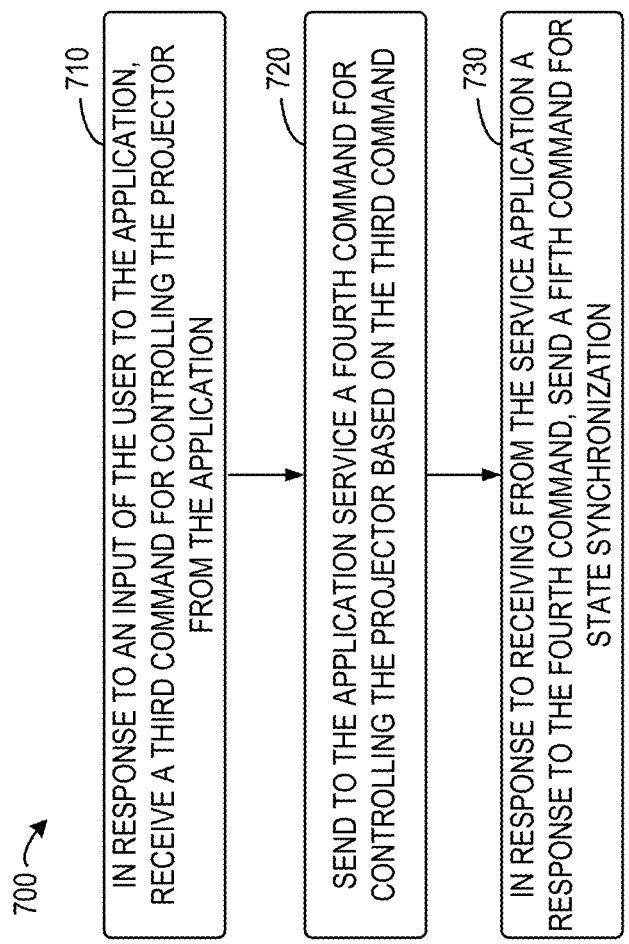
FIG. 7 illustrates a flowchart of a method 700 for controlling the projector based on the operation mode in accordance with the implementations of the subject matter described herein.

FIG. 7 illustrates a flowchart of a method 700 for controlling the projector based on the operation mode according to some other implementations of the subject matter described herein. The method 700 is targeted to the remote control scenario. That is, the user controls the projector 110 by operating the application 111-2. In some implementations, the method 700 can be considered as an example implementation of block 400 as shown in FIG. 4.

As shown in FIG. 7, at block 710, in response to an input of the user to the application 111-2, the application 111-1 receives from application 111-2 a third command for controlling the projector 110.

At block 720, the application 111-1 sends to the application service 112 a fourth command for controlling the projector 110 based on the third command. For example, the application service 112 may cause the projector 110 to output the projection display 140 corresponding to the input of the user by accessing the hardware driver 113 based on the fourth command. Besides, the application service 112 can return to the application 111-2 a response to the third command.

At block 730, in response to receiving a response to the fourth command from the application service 112, the application 111-1 sends to the application 111-2 a fifth command for synchronizing states between the applications 111-1 and 111-2. For example, the application 111-2 can update its own state based on the fifth command (for example, state data and user interface display associated with the application 111-2 and so on).

Figure 8:
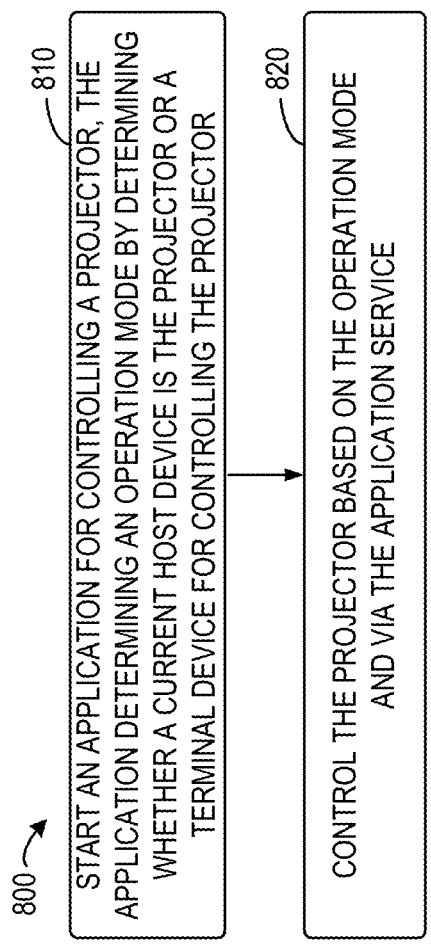
FIG. 8 illustrates a flowchart of an example method 800 for controlling the projector in accordance with the implementations of the subject matter described herein.

FIG. 8 illustrates a flowchart of an example method 800 for controlling the projector according to the implementations of the subject matter described herein. In some implementations, the method 800 can be, for example, executed at the terminal device 120 as shown in FIG. 1. For the ease of depiction, the method 800 is depicted with reference to system 100 as shown in FIG. 1. It is to be understood that method 800 may further include additional steps not shown and/or omit the shown steps. The scope of the subject matter described herein is not limited in this aspect.

At block 810, the application 111-2 for controlling the projector 110 is started. In some implementations, the application 111-2 can determine its operation mode by determining whether the current host device is the projector 110 or the terminal device 120 for controlling the projector 110. In some implementations, the application 111-2 can execute the method 500 as shown in FIG. 5 to determine its operation mode. For example, as the application service 112 and the application 111-2 operate on different devices (that is, the application 111-2 detects that the application service 112 does not exist in the current device), the operation mode of the application 111-2 can be determined to be the second operation mode for the terminal device.

At block 820, the projector 110 is controlled based on the operation mode of the application 111-2 and via the application service 112.

Figure 9:
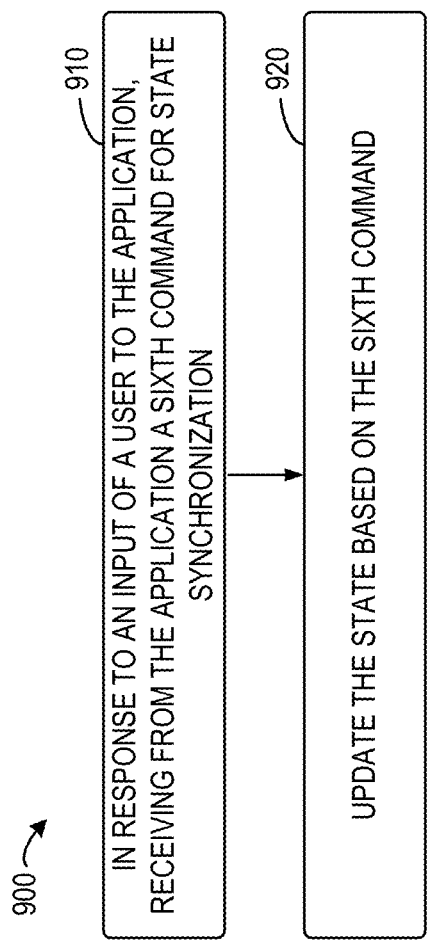
FIG. 9 illustrates a flowchart of a method 900 for controlling the projector in accordance with the implementations of the subject matter described herein.

FIG. 9 illustrates a flowchart of a method 900 for controlling the projector based on the operation mode according to some implementations of the subject matter described herein. The method 900 is targeted to the local control scenario. That is, the user controls the projector 110 by operating the application 111-1. In some implementations, the method 900 can be regarded as an example implementation of the block 820 as shown in FIG. 8.

As shown in FIG. 9, at block 910, in response to an input of the user to the application 111-1, the application 111-2 can receive from application 111-1 a sixth command for synchronizing states between the applications 111-1 and 111-2. For example, in response to the input of the user to the application 111-1, the application 111-1 enables the projector 110 to output the projection display 140 corresponding to the input of the user by accessing the hardware driver 113 via the application service 112. Upon receiving a response from the application service 112, the application 111-1 can send the sixth command to the application 111-2.

At block 920, the application 111-2 can update its own state (such as state data and user interface display associated with the application 111-2 and so on) based on the sixth command.

Figure 10:
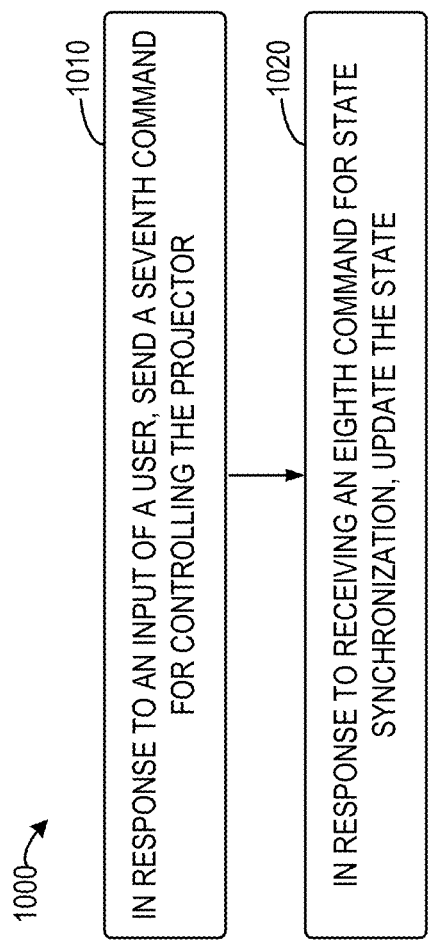
FIG. 10 illustrates a flowchart of a method 1000 for controlling the projector based on the operation mode in accordance with the implementations of the subject matter described herein.

FIG. 10 illustrates a flowchart of a method 1000 for controlling the projector based on the operation mode according to some other implementations of the subject matter described herein. The method 1000 is targeted to the remote control scenario. That is, the user can control the projector 110 by operating the application 111-2. In some implementations, the method 1000 can be considered as an example implementation of block 820 as shown in FIG. 8.

At block 1010, in response to an input of the user to the application 111-2, the application 111-2 sends to the application 111-1 a seventh command for controlling the projector. For example, the application 111-1 enables the projector 110 to output the projection display 140 corresponding to the input of the user by accessing the hardware driver 113 via the application service 112. Upon receiving a response from the application service 112, the application 111-1 can send to the application 111-2 an eighth command for synchronizing states between the applications 111-1 and 111-2.

At block 1020, in response to receiving the eighth command from the application 111-1, the application 111-2 updates its own state based on the eighth command (for example, state data and user interface display associated with the application 111-1 and so on).

As can be seen from the above descriptions, with the projector control scheme according to the implementations of the subject matter described herein, the projector manufacturer can develop an application for controlling the projector in a manner that is transparent to the hardware platform such that the same application can operate on different hardware platforms. Moreover, the scheme enables the application to determine its operation mode by itself to adapt to different application scenarios, such as local control and remote control, automatically. Therefore, with the scheme, the projector manufacturer can implement a smart projector based on, for instance, Universal Windows Platform (UWP) efficiently, which achieves better compatibility with office applications commonly used in PCs and more security, thereby providing users with better operating experience.

Figure 11:
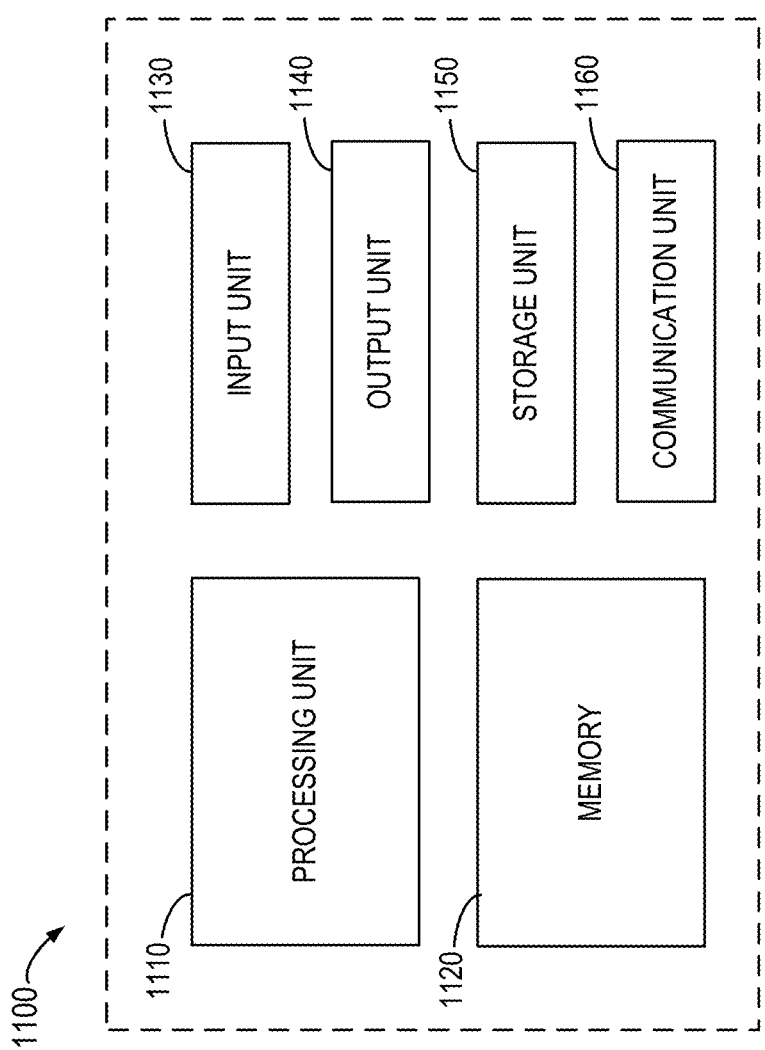
FIG. 11 illustrates a block diagram of an example computing system/server in which one or more implementations of the subject matter described herein may be implemented.

FIG. 11 illustrates a block diagram of an example computing system/server 1100 in which one or more implementations of the subject matter described herein may be implemented. For example, in some implementations, the projector 110 and/or the terminal device 120 shown in FIG. 1 can be implemented by the computing system/server 1100. The computing system/server 1100 shown in FIG. 11 is only an example, which should not be constructed as any limitation to the function and scope of use of the implementations of the subject matter described herein.

As shown in FIG. 11, the computing system/server 1100 is in a form of a general-purpose computing device. Components of the computing system/server 1100 may include, but are not limited to, one or more processors or processing units 1110, a memory 1120, one or more input devices 1130, one or more output devices 1140, storage 1150, and one or more communication units 1160. The processing unit 1110 may be a real or a virtual processor and is capable of performing various processes in accordance with a program stored in the memory 1120. In a multi-processing system, multiple processing units execute computer-executable instructions to increase processing power.

The computing system/server 1100 typically includes a variety of machine readable medium. Such medium may be any available medium that is accessible by the computing system/server 1100, including but not limited to, volatile and non-volatile medium, removable and non-removable medium. The memory 1120 may be volatile memory (e.g., registers, cache, a random-access memory (RAM)), non-volatile memory (e.g., a read only memory (ROM), an electrically erasable programmable read only memory (EEPROM), a flash memory), or some combination thereof. The storage 750 may be removable or non-removable, and may include machine readable medium such as flash drives, magnetic disks or any other medium which can be used to store information and which can be accessed within the computing system/server 1100.

The computing system/server 1100 may further include other removable/non-removable, volatile/non-volatile computing system storage medium. Although not shown in FIG. 11, a disk driver for reading from or writing to a removable, non-volatile disk (e.g., a "floppy disk"), and an optical disk driver for reading from or writing to a removable, non-volatile optical disk can be provided. In these cases, each driver can be connected to the bus by one or more data medium interfaces.

The memory 1120 may include at least one program product having a set (e.g., at least one) of program modules that are configured to carry out the functions of various implementations of the subject matter described herein. For example, when one or more modules of the projector 110 and/or terminal device 120 are implemented as software modules, they can be stored in the memory 1120. Such modules, when accessed and operated by the processing unit 1100, can carry out the functions and/or methodologies described herein, such as method 400, 500, 600, 700, 800, 900 and/or 1000.

The input unit(s) 1130 may be one or more of various different input devices. For example, the input unit(s) 1139 may include a user device such as a mouse, keyboard, trackball, etc. The communication unit(s) 1160 enables communication over communication medium to another computing entity. Additionally, functionality of the components of the computing system/server 1100 may be implemented in a single computing cluster or in multiple computing machines that are able to communicate over communication connections. Thus, the computing system/ server 1100 may operate in a networked environment using logical connections to one or more other servers, network personal computers (PCs), or another common network node. By way of example, and not limitation, communication media include wired or wireless networking techniques.

The computing system/server 1100 may also communicate, as required, with one or more external devices (not shown) such as a storage device, a display device, and the like, one or more devices that enable a user to interact with the computing system/server 1100, and/or any device (e.g., network card, a modem, etc.) that enables the computing system/server 1100 to communicate with one or more other computing devices. Such communication may be performed via an input/output (I/O) interface(s) (not shown).

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Some implementations of the subject matter described herein are listed below.

In a first aspect, there is provided a computer-implemented device. The device includes a processing unit and a memory. The memory is coupled to the processing unit and stores instructions for execution by the processing unit. The instructions, when executed by the processing unit, cause the device to perform actions comprising: starting a first application for controlling a projector, the first application determining an operation mode by determining whether a current host device is the projector or a terminal device for controlling the projector; and controlling the projector based on the operation mode and via an application service operating on the projector, the application service providing an interface for controlling a device driver of the projector.

In some implementations, the first application includes an application service extension module for interacting with the application service, and the application service extension module provides to the application a uniform interface for operating the projector.

In some implementations, the actions further comprise: in response to determining that the host device is the projector, before the first application is started, starting the operating system deployed on the projector; and starting the application service on the operating system, the application service further providing an interface to at least one of an office application and a voice assistant provided by the operating system.

In some implementations, the application service operates in a user mode of the operating system and the device driver operates in a kernel mode of the operating system.

In some implementations, controlling the projector comprises: in response to the operation mode being determined as a first operation mode for the projector, sending, based on a user input and via the first application, a first command for controlling the projector to the application service; and in response to receiving from the service application a response to the first command, sending, to a second application operating on the terminal device, a second command for synchronizing states between the first application and the second application.

In some implementations, controlling the projector further comprises: receiving, via the first application and from the second application, a third command for controlling the projector; sending, based on the third command, a fourth command for controlling the projector to the application service; and in response to receiving from the application service a response to the fourth command, sending to the second application a fifth command for synchronizing states between the first application and the second application.

In some implementations, controlling the projector comprises: in response to the operation mode being determined as a second operation mode for the terminal device, receiving, from a third application operating on the projector, a sixth command for synchronizing states between the first application and the third application based on a user input and via the first application; and updating a state of the first application based on the sixth command.

In some implementations, controlling the projector further comprises: sending, via the first application, a seventh command for controlling the projector to the third application; and in response to receiving from the third application an eighth command for synchronizing states between the first application and the third application, updating the state of the first application.

In some implementations, the first application, the second application and the third application are instances of a same application.

In a second aspect, there is provided a computer-implemented method. The method comprises: starting a first application for controlling the projector, the first application determining an operation mode by determining whether a current host device is the projector or a terminal device for controlling the projector; and controlling the projector based on the operation mode and via an application service operating on the projector, the application service providing an interface for controlling a device driver of the projector.

In some implementations, the first application includes an application service extension module for interacting with the application service and the application service extension module provides to the application a uniform interface for operating the projector.

In some implementations, the method further comprises: in response to determining that the host device is the projector, before the first application is started, starting the operating system deployed on the projector; and starting the application service on the operating system, the application service further providing an interface to at least one of an office application and a voice assistant provided by the operating system.

In some implementations, the application service operates in a user mode of the operating system and the device driver operates in a kernel mode of the operating system.

In some implementations, controlling the projector comprises: in response to the operation mode being determined as a first operation mode for the projector, sending, based on a user input and via the first application, a first command for controlling the projector to the application service; and in response to receiving from the service application a response to the first command, sending, to a second application operating on the terminal device, a second command for synchronizing states between the first application and the second application.

In some implementations, controlling the projector further comprises: receiving, via the first application and from the second application, a third command for controlling the projector; sending, based on the third command, a fourth command for controlling the projector to the application service; and in response to receiving from the application service a response to the fourth command, sending to the second application a fifth command for synchronizing states between the first application and the second application.

In some implementations, controlling the projector comprises: in response to the operation mode being determined as a second operation mode for the terminal device, receiving, from a third application operating on the projector, a sixth command for synchronizing states between the first application and the third application based on a user input and via the first application; and updating a state of the first application based on the sixth command.

In some implementations, controlling the projector further comprises: sending, via the first application, a seventh command for controlling the projector to the third application; and in response to receiving from the third application an eighth command for synchronizing states between the first application and the third application, updating the state of the first application.

In some implementations, the first application, the second application and the third application are instances of a same application.

In the third aspect, there is provided a computer program product which is tangibly stored on a non-transient machine-readable medium and comprising machine-executable instructions. The machine-executable instructions, when executed by a device, causing the device to perform actions of the method according to the second aspect.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:
1. A computer-implemented device, comprising:
a processing unit; and
a memory coupled with the processing unit and storing instructions for execution by the processing unit, the instructions, when executed by the processing unit, causing the device to execute actions, the actions comprising:
starting a first application for controlling a projector, the first application determining an operation mode by determining whether a current host device is the projector or a terminal device for controlling the projector, including determining that the current host device is the projector responsive to detecting that the first application and an application service are operating on a same device, the application service providing an interface for controlling a device driver of the projector; and
controlling the projector based on the operation mode and via the application service operating on the projector.

2. The device according to claim 1, wherein the first application includes an application service extension module for interacting with the application service, and the application service extension module provides to the first application a uniform interface for operating the projector.

3. The device according to claim 1, wherein the actions further comprise:
in response to determining that the current host device is the projector,
before starting the first application, starting an operating system deployed on the projector; and
starting the application service on the operating system, the application service further providing an interface to at least one of an office application and a voice assistant provided by the operating system.

4. The device according to claim 3, wherein the application service operates in a user mode of the operating system and the device driver operates in a kernel mode of the operating system.

5. The device according to claim 1, wherein controlling the projector comprises:
in response to the operation mode being determined as a first operation mode for the projector, sending, based on a user input and via the first application, a first command for controlling the projector to the application service; and
in response to receiving from the application service a response to the first command, sending, to a second application operating on the terminal device, a second command for synchronizing states between the first application and the second application.

6. The device according to claim 5, wherein controlling the projector further comprises:
  receiving, via the first application and from the second application, a third command for controlling the projector;
  sending, based on the third command, a fourth command for controlling the projector to the application service; and
  in response to receiving from the application service a response to the fourth command, sending to the second application a fifth command for synchronizing states between the first application and the second application.

7. The device according to claim 5, wherein controlling the projector comprises:
  in response to the operation mode being determined as a second operation mode for the terminal device, receiving, from a third application operating on the projector, a sixth command for synchronizing states between the first application and the third application based on a user input and via the first application; and
  updating a state of the first application based on the sixth command.

8. The device according to claim 7, wherein controlling the projector further comprises:
  sending, via the first application, a seventh command for controlling the projector to the third application; and
  in response to receiving from the third application an eighth command for synchronizing states between the first application and the third application, updating the state of the first application.

9. The device according to claim 7, wherein the first application, the second application and the third application are instances of a same application.

10. A computer-implemented method, comprising:
  starting a first application for controlling a projector, the first application determining an operation mode by determining whether a current host device is the projector or a terminal device for controlling the projector, including determining that the current host device is the projector responsive to detecting that the first application and an application service are operating on a same device, the application service providing an interface for controlling a device driver of the projector; and
  controlling the projector based on the operation mode and via the application service operating on the projector.

11. The method according to claim 10, wherein the first application includes an application service extension module for interacting with the application service, and the application service extension module provides to the first application a uniform interface for operating the projector.

12. The method according to claim 10, wherein the method further comprises:
  in response to determining that the current host device is the projector,
    before starting the first application, starting an operating system deployed on the projector; and
    starting the application service on the operating system, the application service further providing an interface to at least one of an office application and a voice assistant provided by the operating system.

13. The method according to claim 12, wherein the application service operates in a user mode of the operating system and the device driver operates in a kernel mode of the operating system.

14. The method according to claim 10, wherein controlling the projector comprises:
  in response to the operation mode being determined as a first operation mode for the projector, sending, based on a user input and via the first application, a first command for controlling the projector to the application service; and
  in response to receiving from the application service a response to the first command, sending, to a second application operating on the terminal device, a second command for synchronizing states between the first application and the second application.

15. The method according to claim 14, wherein controlling the projector further comprises:
  receiving, via the first application and from the second application, a third command for controlling the projector;
  sending, based on the third command, a fourth command for controlling the projector to the application service; and
  in response to receiving from the application service a response to the fourth command, sending to the second application a fifth command for synchronizing states between the first application and the second application.

16. The method of claim 10, wherein determining whether the current host device is the projector or the terminal device for controlling the projector includes determining that the current host device is the terminal device responsive to detecting that the first application and the application service are operating on different devices.

17. The method of claim 10, wherein determining whether the current host device is the projector or the terminal device for controlling the projector includes determining whether the application service exists in the current host device.

18. The device of claim 1, wherein determining whether the current host device is the projector or the terminal device for controlling the projector includes determining that the current host device is the terminal device responsive to detecting that the first application and the application service are operating on different devices.

19. The device of claim 1, wherein determining whether the current host device is the projector or the terminal device for controlling the projector includes determining whether the application service exists in the current host device.

* * * * *